United States Patent [19]
Asher

[11] Patent Number: 6,014,838
[45] Date of Patent: Jan. 18, 2000

[54] FLOATABLE UNIT FOR DECORATIVE VEGETATION

[76] Inventor: Connie Maureen Asher, 17460 Hilltop Ridge, Eureka, Mo. 63025

[21] Appl. No.: 09/062,016

[22] Filed: Apr. 17, 1998

[51] Int. Cl.[7] ................................. A01G 31/02
[52] U.S. Cl. ................................. 47/65; 47/39
[58] Field of Search ............... 47/65, 39; 119/218, 119/219, 223, 246, 247

[56] References Cited

U.S. PATENT DOCUMENTS

| 4,382,348 | 5/1983 | Kitsu et al. ......................... 47/65 F |
| 4,513,533 | 4/1985 | Gething et al. ..................... 47/65 F |

FOREIGN PATENT DOCUMENTS

| 2053416 | 5/1972 | Germany .................... 47/79 |
| 969208 | 11/1982 | Japan ........................ 47/65 F |
| 1675226 | 9/1991 | U.S.S.R. ..................... 47/65 F |
| 1543961 | 4/1979 | United Kingdom ........ 47/65 F |

*Primary Examiner*—Robert P. Swiatek
*Assistant Examiner*—Joanne C. Downs
*Attorney, Agent, or Firm*—Norman L. Wilson, Jr.

[57] ABSTRACT

A buoyant apparatus is provided for floating plants and other foliage in ponds. It is directed to a floating support or raft for one or more plant pots. Such materials are attractive to fish and other aquatic animals frequently present in such decorative ponds. In the floatable foliage pots herein the floating base or collar is protected so that it cannot be chewed, and ruined by aquatic animals. A mesh screen is adapted to cover exposed surfaces of the collar to prevent fish from biting it.

4 Claims, 2 Drawing Sheets

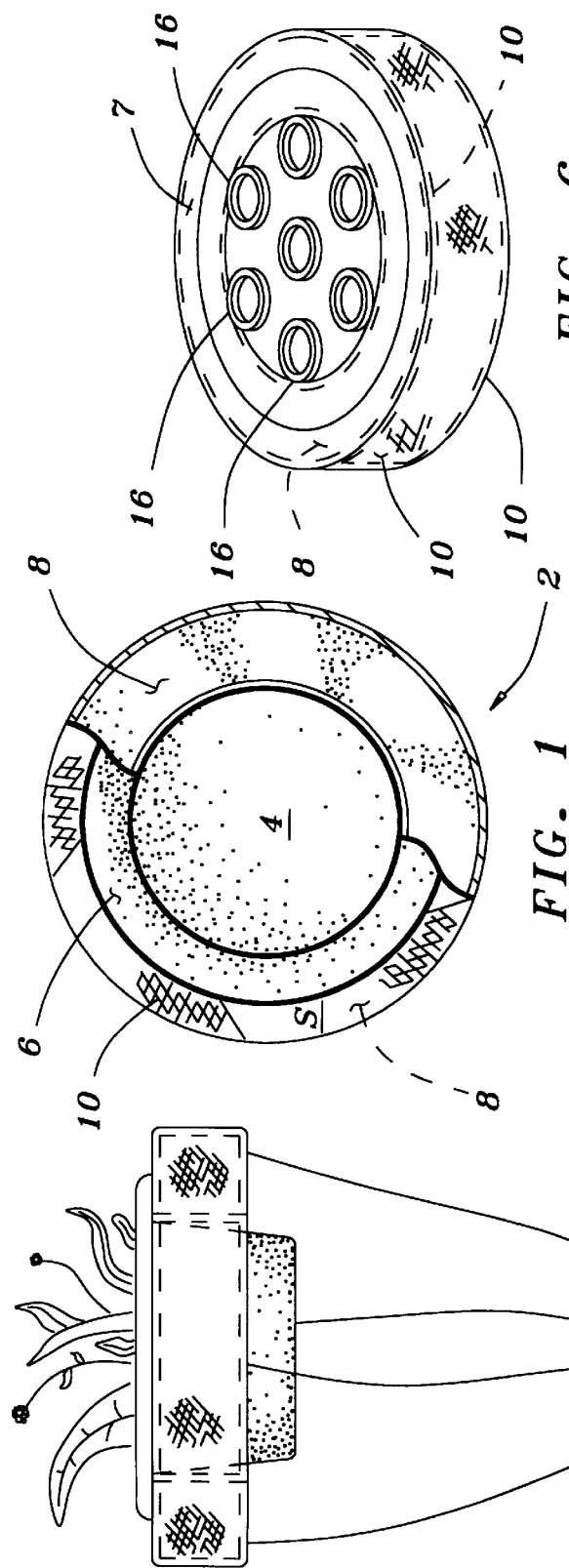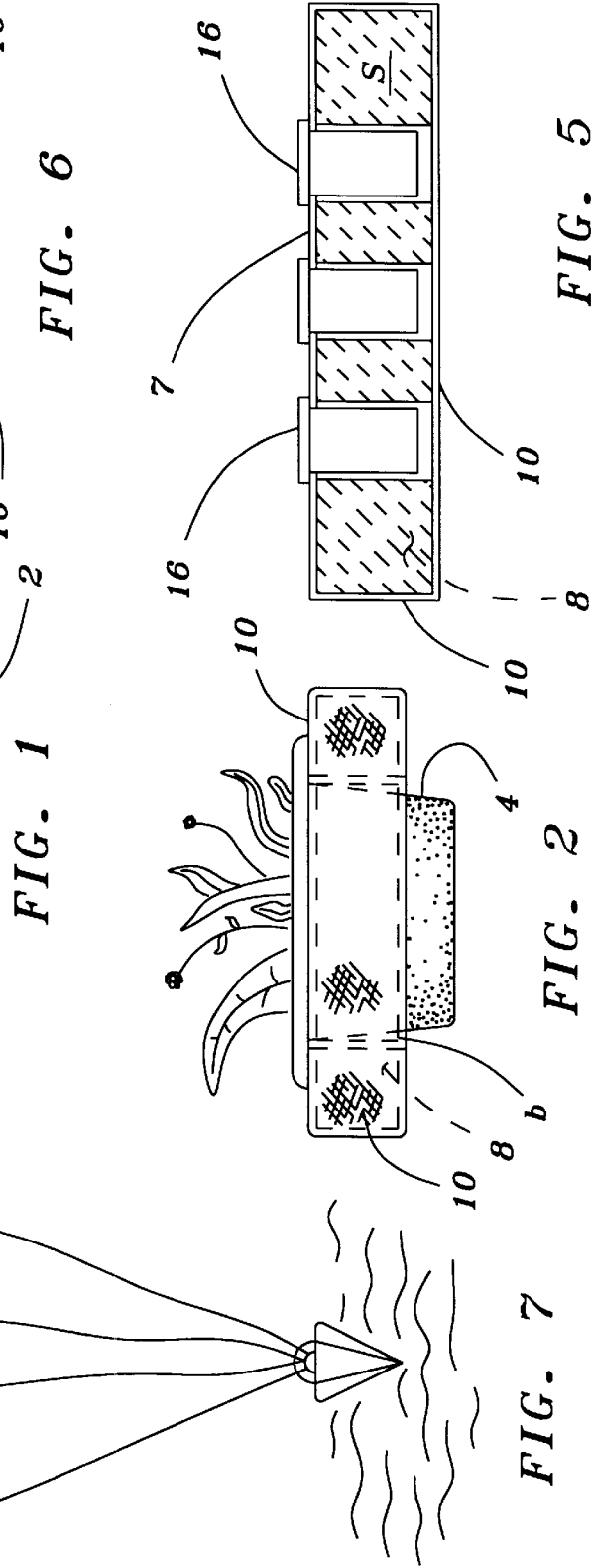

FLOATABLE UNIT FOR DECORATIVE VEGETATION

BACKGROUND OF THE INVENTION

This invention relates to a buoyant apparatus for floating plants and other foliage in ponds, such as water gardens, decorative pools, miniature lakes and the like. In a more specific aspect this invention pertains to a plant pot or container for foliage, and a floatable base surrounding the plant container enabling it to float in a pond.

U.S. Pat. No. 2,531,562 relates to a buoy for floral plants and other decorative vegetation. It is directed particularly to a floating support or raft for one or more conventional plant pots. U.S. Pat. No. 2,531,562 contemplates a device for maintaining various types of growing plants on the surface of water in ponds, thus enhancing, along with the ponds, the beauty of the landscape. It enhances the beauty of the pond by the addition of a variety of shapes and designs of floral arrangements made possible by the floating unit. The plant buoy described in U.S. Pat. No. 2,531,562 is in the form of a rubber or plastic ring or collar adapted to float, in combination with a plant pot which fits within the ring as it floats.

The rings or collars described in U.S. Pat. No. 2,531,562 are excellent and economical devices by which decorative floral arrangements can be floated in outdoor and indoor pools, or located on small lakes and ponds. However they are subject to certain disadvantages. Materials suitable for use as floating collars for use in U.S. Pat. No. 2,531,562 are foamed plastics, such as foamed polystyrene, or inflatable materials such as plastic and rubber. Such materials are attractive to fish and other aquatic animals frequently present in such decorative ponds. It has been found that the aquatic animals bite, chew, or eat the collars, ruining their appearance, or, over time, destroying them.

It is an object of this invention to provide for foliage pots a floatable base or collar which is protected against chewing, and in the long term, against being ruined by aquatic animals.

SUMMARY OF THE INVENTION

For displaying decorative vegetation or foliage on ponds a floating unit for that foliage is provided. The unit is the type including a container with a collar adapted to surround that container. The container is in the form of a pot adapted to hold soil and the foliage. The collar is a floatation means fabricated of a light weight floating material adapted to cause the pot to float. In combination with the floating unit is a mesh screen. This screen covers the exposed surfaces of the collar to prevent aquatic animals such as fish from ruining the collar.

In its broader aspect this invention relates to a floating foliage unit which resists the biting of the floatable base by aquatic animals. For a more complete understanding of the invention it will now be described in conjunction with the accompanying drawings.

DESCRIPTION OF THE DRAWINGS

In the drawings:

FIG. 1 is a top view partially cut away showing the circular form of the invention.

FIG. 2 is a side view showing the invention as utilized, with a plurality of different plants therein.

FIGS. 5, 6 and 7 illustrate still other embodiments of the invention.

DETAILED DESCRIPTION OF THE INVENTION

Figures 3, 4:
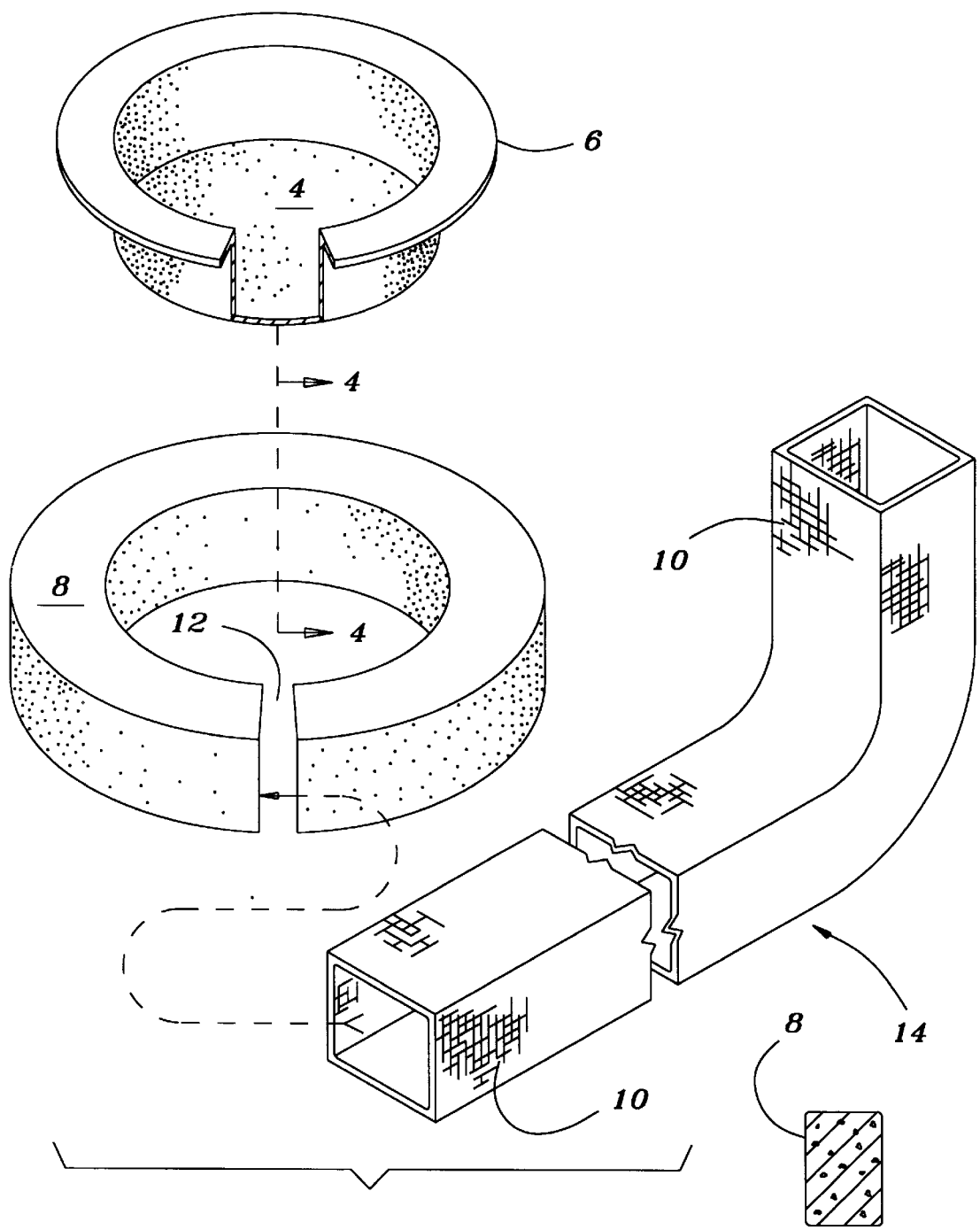
FIG. 3 is an exploded perspective view partially in section of the preferred floating foliage unit constructed in accordance with this invention.
FIG. 4 is a cross section of the floatable collar taken through 4—4 of FIG. 3.

FIG. 1 illustrates, looking down at its top, the components of the floating unit 2 of the invention. The right side is cut away so that the components can be better visualized. In the form illustrated in FIG. 1, the invention contemplates a plant pot 4 of the conventional type except that it is provided with an annular flange or ledge 6 at its top end which overlaps floatable support or collar 8. In the pond pot 4 is supported by collar or floating ring 8 which keeps it from sinking in the pond due to its weight. In order that it be held or retained in the floating collar, rim 6 defines a shoulder around its upper edge. The shoulder engages the upper inner surface of ring 8 so that the weight of the soil filled pot will not force it through the ring opening. Preferably plant pot 4 will be tapered to conform to the inner ring shape. If desired an aperture can be provided in the bottom of plant pot 4 so that the growing foliage can receive its required moisture as described in U.S. Pat. No. 2,531,562.

The foliage container 4 and buoyant float member 8 are illustrated in FIG. 2. As can be seen the container or plant pot 4 is a substantially cylindrical holder, opened at the top end to form a body or cavity to receive the foliage as illustrated in FIG. 2. The plant pot can be supported by the buoy member when the pot is made of plastic and light weight metals. Floating member 8 can be fabricated of hollow rubber or floatable plastic materials as described in U.S. Pat. No. 2,531,562. Ideally floating collar 8 will be made of a foamable plastic such as foamed polystyrene shown in cross-section in FIG. 4. The invention herein is to prevent these floatable materials from being eroded by water animals as will now be described.

It is to be emphasized that floatable foliage structure 2 is fabricated herein so that the collar therefor cannot be chewed up by aquatic animals in the pond in which the structure is floating. To this end, the outside surfaces s of collar 8 are covered with a screen 10. The screen can be wrapped around surfaces s and then sewn, glued or otherwise attached beneath rim 6, as well as along the base b inside the collar (FIG. 2). The exposed surfaces of the collar will thus be enveloped by a relatively fine mesh screen 10 as shown in FIG. 1. By "relative fine mesh" I mean a screen having a mesh size in the range of about 16 mesh to about 6 or 8 mesh. In actuality the mesh size will be determined by the animals in the decorative pond. Thus the mesh size should not be so great that the animals can catch their teeth in the screen. Although screen 10 can be a wire screen resembling that utilized in screen doors, such screening materials are difficult to use, and the result is unsightly because of creases and wrinkles which develop during application. A tight fitting plastic mesh material such as that employed in newer screens could be used, but that screening is too easily torn to be desirable. Our preferred screen from the aesthetic or appearance point of view is a black mesh screen fabricated of fibers of a plastic such as a polyester or polyamide, say, nylon or Dacron, with the fibers having tensile strengths sufficiently high so that they cannot be readily broken by aquatic animals normally present in decorative ponds. With such materials it is possible to achieve the effect illustrated in FIG. 2.

My preferred form of the invention is illustrated in FIG. 3. Rather than sewing or bonding the mesh screen to the collar it has been found desirable to utilize a split collar as shown in FIG. 3. As shown collar 8 has a slit 12 therethrough at one point in its periphery so that it resembles a lock washer. Employed with this split collar is a mesh screen 10 in the form of a sleeve 14. Since the plastic from which collar 8 is fabricated is somewhat resilient, the collar can be spread slightly apart, widening gap 12. By opening gap 12 sleeve 14 can be slipped on collar 8 little-by-little until the sleeve envelopes the entire collar. Flower pot 4 can then be inserted in the circular opening in the mesh screen covered collar. With sleeve 14 in place, with gap 12 sprung back to its original substantially closed position, and with the rim over the collar (8), the floating foliage unit will be covered by the mesh screen sleeve so that it looks just like that illustrated in FIGS. 1 and 2. The invention thus provides an ideal decorative floating island which will not be destroyed or mutilated by animals which live in the pond as an additional source of attraction.

OTHER EMBODIMENTS

Having been given the teachings of this invention, other variations and ramifications will occur to one skilled in this art. As an example various colors of collars and of mesh screens can be used to match the foliage being grown in the flower pot or for other environmental considerations. Indeed, different colors can be used for the collar and for the mesh screen for an interesting contrast. As another example twigs, water plant stems or grass blades, either natural or artificial, can be inserted in the mesh openings in the enveloping screen. In addition foliage pot 4 can be compartmentalized. Desirably a series of adjacent pots can be inserted in the center opening in the supporting collar as illustrated in FIG. 5. In other words collar 8 can support any number of plant receptacles as shown in FIG. 6 and suggested in U.S. Pat. No. 2,531,562. The only requirement is that in order for the device to float the collar must confer sufficient buoyancy to support the weight of that number of pots or containers with the plants in them, along with the added weight of potting soils which may be employed. Collar 8 will, of course, be enveloped by mesh screen 10 in accordance with the invention. As still another variation of the invention an anchor or ballast 7 can be suspended from the bottom of the pot portion of the floating island by lines 9 as illustrated in FIG.7 so that the island will not drift. Such modifications are deemed to be within the scope of this invention.

What is claimed is:

1. A floatable unit for displaying foliage on ponds, the unit including (a) a plant pot having a cavity adapted to receive soil and foliage, (b) a buoyant float member adapted to receive said plant pot and to float with sufficient buoyancy to support the weight of said plant pot, and (c) means preventing the buoyant float member from being eroded by aquatic animals, said means including a tight fitting screen, said screen being wrapped around surfaces of the buoyant float member exposed to aquatic animals, said screen having a tensile strength sufficiently high so that the screen cannot be readily broken by the aquatic animals.

2. The floatable unit of claim 1 wherein the buoyant float member receives a plurality of plant pots.

3. A floatable unit for displaying foliage on ponds, the unit including (a) a pot having inner and outer walls adapted to hold soil and the foliage, and (b) floatation means fabricated of a light weight floating material in the form of a collar adapted to surround the outer pot walls to cause the pot to float, in combination with (c) a mesh screen covering exposed surfaces of the collar to prevent fish from ruining the collar wherein the mesh screen is in the form of a sleeve, and the collar has a slit therethrough at one point in its periphery adapted to receive the sleeve.

4. The floatable unit of claim 3 wherein the pot has a ballast attached to the bottom thereof.

\* \* \* \* \*